United States Patent [19]

Baker et al.

[11] Patent Number: 4,728,806
[45] Date of Patent: Mar. 1, 1988

[54] DC LINK VARIABLE SPEED CONSTANT FREQUENCY POWER SOURCE PARALLELING CONTROLS

[75] Inventors: Donal E. Baker, American Township, Allen County; Mirza A. Beg, Lima, both of Ohio

[73] Assignee: Westinghouse Electric Corp., Pittsburgh, Pa.

[21] Appl. No.: 938,661

[22] Filed: Dec. 5, 1986

[51] Int. Cl.$^4$ .............................................. H02J 3/00
[52] U.S. Cl. ........................................ 307/43; 307/46; 307/66; 307/87; 322/25; 322/28
[58] Field of Search ............... 307/43, 44, 45, 47, 307/57, 64, 66, 73, 75, 76, 78, 84, 85, 86, 87; 290/1 R, 40 R, 40 C, 40 E; 322/17, 20, 25, 27, 32

[56] References Cited

U.S. PATENT DOCUMENTS

| | | | |
|---|---|---|---|
| 2,872,591 | 2/1959 | Stineman | 307/84 X |
| 3,294,976 | 12/1966 | Tipton et al. | |
| 3,303,349 | 2/1967 | Sinclair et al. | 307/57 X |
| 3,381,205 | 4/1968 | Howell et al. | |
| 3,539,820 | 11/1970 | Kessler | |
| 3,683,199 | 8/1972 | Billings et al. | |
| 3,748,489 | 7/1973 | South | 307/87 |
| 3,748,493 | 7/1973 | Billings et al. | |
| 3,794,846 | 2/1974 | Schlicher et al. | 307/87 |
| 3,879,670 | 4/1975 | Fox | |
| 3,971,978 | 7/1976 | Chambers et al. | 322/25 X |
| 3,996,507 | 12/1976 | Chambers | 322/28 X |
| 4,069,424 | 1/1978 | Burkett | 307/87 |
| 4,114,048 | 9/1978 | Hull et al. | 307/66 X |
| 4,173,774 | 11/1979 | Hyvarinen et al. | |
| 4,246,531 | 1/1981 | Jordan | 322/28 |
| 4,251,735 | 2/1981 | Coleman | 307/46 |
| 4,251,736 | 2/1981 | Coleman | 307/66 X |
| 4,308,465 | 12/1981 | Lafuze | 307/87 |
| 4,510,399 | 4/1985 | Baker | |
| 4,520,319 | 5/1985 | Baker | |
| 4,575,671 | 3/1986 | Lee et al. | 307/87 X |
| 4,587,604 | 5/1986 | Nerone | 307/87 X |

Primary Examiner—William M. Shoop, Jr.
Assistant Examiner—Paul Ip
Attorney, Agent, or Firm—R. P. Lenart

[57] ABSTRACT

A parallel power system includes at least two DC link variable speed constant frequency power sources each having a plurality of output phases connected to a common bus. The total real error current flowing in the output phases of each of the power sources is monitored and the relative phase angle of the Thevenin voltage of the power sources is controlled in response to the monitored total real error current to reduce the magnitude of this real error current. The reactive error current flowing in at least one of the output phases of each of the power sources is monitored and the relative magnitude of the Thevenin voltage of the power sources is controlled in response to the monitored reactive error current to reduce the magnitude of the reactive error current. For operation at no load, the phase angle control loop is sensitive to both real and reactive error currents.

28 Claims, 2 Drawing Figures

DC LINK VARIABLE SPEED CONSTANT FREQUENCY POWER SOURCE PARALLELING CONTROLS

BACKGROUND OF THE INVENTION

This invention relates to DC link variable speed constant frequency (VSCF) power systems having at least two parallel connected channels, and more particularly, to a method for reducing unbalanced current flow in such systems and a circuit which performs that method.

AC electric power systems are usually connected in parallel to increase total system rating or, in certain cases such as airborne power systems, to increase reliability. In order to further improve reliability and to maximize efficiency, it is generally desired that the total system load be divided equally among the paralleled channels. In any paralleled system, AC or DC, the load sharing among channels can be accomplished by inserting impedance in series with each channel. Such impedance is usually objectionable because in addition to forcing current sharing, it creates unwanted voltage droop at the point of regulation where the channels are tied together. By sensing difference currents between participating channels and applying this error current in a manner which minimizes the system unbalance, it is possible to effectively insert a "paralleling" impedance which appears only between the channels but not in the load circuit. This "paralleling" impedance is an apparent impedance rather than a real lumped impedance and is simulated in the controls rather than in the power circuit of the power supply In paralleled DC systems, only the magnitude of the voltage must be controlled to minimize unbalanced current error since the DC voltage source is defined by its magnitude. In an AC paralleled system, two parameters, magnitude and phase angle, must be controlled. It is assumed that in AC systems, all of the paralleled channels are operating at the same frequency.

The exact method of control of AC systems is dependent upon the impedances between the paralleled source Thevenin voltages. For example, if the impedance between sources is primarily resistive, then a difference in Thevenin voltage magnitude will create an unbalance in real power and a phase angle unbalance will create an unbalance in reactive power. The impedance between sources includes the source or Thevenin impedance, feeder bus impedance, and any parallel tie bus impedances.

DC link VSCF systems have output filters consisting of a series inductor and a shunt capacitor. The output impedance of a DC link VSCF system therefore looks capacitive or leading as viewed from the load. The difference impedance for paralleling purposes, however, does not include the filter capacitor or other shunt connected load impedances. Only series connected impedances are important when viewed from source to source. The actual difference impedance for any one channel includes both its filter inductor impedance and the feeder impedance to the point of load connection. This is very similar to constant speed generator type systems which by their nature are inductive machines. In fact, the magnitude of the difference impedance is similar because a VSCF filter inductor is approximately 0.1 per unit, a value which is typical for a constant speed generator subtransient reactance.

Because of this inductive impedance, small phase angle errors result in difference currents which are in phase with the Thevenin voltage of the power sources and magnitude errors result in error current which is in quadrature with the Thevenin voltage. Hence the DC link VSCF parallel control system must use phase angle for real load division control and magnitude for reactive load control. This is identical to the conventional constant speed generator type systems which have been in use for many years.

When parallel connected DC link VSCF power sources are operated at no load or are very lightly loaded, a problem results from the fact that the DC link VSCF power sources have a discontinuous real power characteristic. In fact, the VSCF inverters cannot pass negative power from the AC output side to the generator shaft input side, due to the presence of a DC link rectifier. The reactive power characteristics, on the other hand, are linear through zero and are unaffected by the DC link rectifier. A conventional constant speed synchronous generator parallel system has continuous linear functions through zero for both real and reactive power. This inherent difference between the two systems means that the DC link VSCF parallel link controls cannot be the same as the parallel link controls used on a conventional constant speed drive parallel system.

SUMMARY OF THE INVENTION

A parallel power system constructed in accordance with the present invention comprises at least two DC link variable voltage power sources each having a plurality of output phases connected to a multiple phase common bus. The power sources are operated at substantially the same output frequency and circuitry is provided for monitoring the total real error current flowing in the output phases of each of the power sources. The relative phase angle of the Thevenin voltage of the power sources is controlled in response to the sensed total real error current, to reduce the magnitude of the real error current. Circuitry is also provided to monitor the reactive error current flowing in at least one of the output phases of each of the power sources and the relative magnitude of the Thevenin voltage of the power sources is controlled in response to the sensed reactive error current, to reduce the magnitude of the reactive error current. For operation with no load, the phase angle control loop is sensitive to both real and reactive error currents so that the phase angle of the Thevenin voltage is controlled in response to both real and reactive error currents.

This invention also encompasses the method of controlling parallel connected DC link variable speed constant frequency multiple phase power sources wherein the control method comprises the steps of monitoring the total real error current flowing in the output phases of the power sources, controlling the relative phase angle of the Thevenin voltage of the power sources in response to the total real error current, monitoring the reactive error current flowing in at least one of the output conductors of the parallel connected power sources, and controlling the relative magnitude of the Thevenin voltage of the power sources in response to the reactive error current. For no load operation, both real and reactive error currents are used to control the phase angle of the Thevenin voltage of the power sources.

DESCRIPTION OF THE PREFERRED EMBODIMENT

Figure 1:
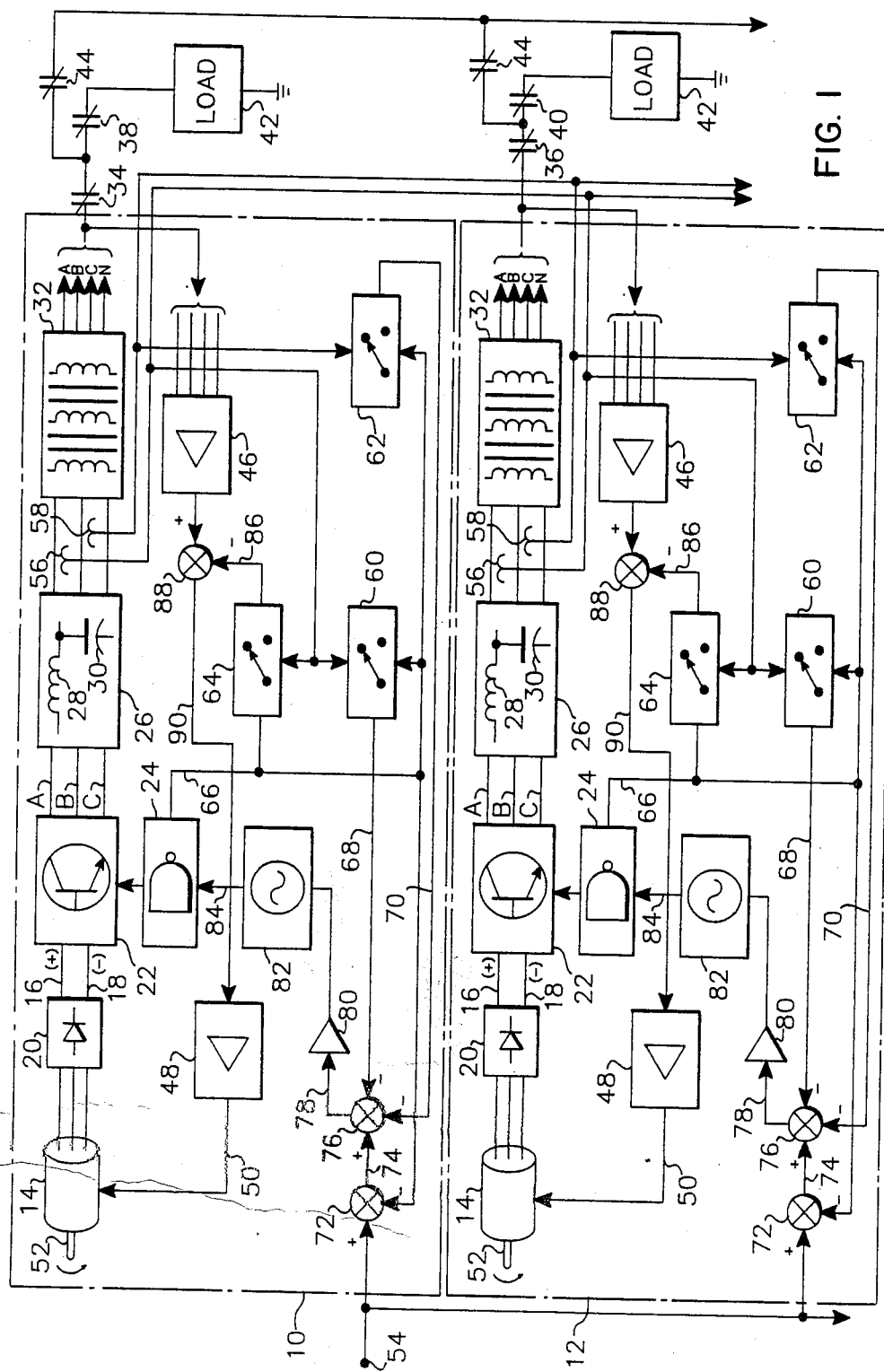
FIG. 1 is a schematic diagram of a parallel connected power system constructed in accordance with one embodiment of the present invention.

Referring to the drawings, FIG. 1 is a schematic diagram of a parallel connected power system constructed in accordance with one embodiment of the present invention. This power system includes two power channels 10 and 12 each having a DC link variable speed constant frequency power source and associated control circuits. Each DC link VSCF power source includes a generator 14 which supplies power to a pair of DC link conductors 16 and 18 by way of a rectifier circuit 20. A switching circuit 22, which is typically in the form of a transistor bridge circuit, switches voltage from the DC link conductors to a plurality of output phase conductors A, B and C, in accordance with a switching pattern supplied by a waveform pattern generator circuit 24. An output filter 26 is connected in series with the output phase conductors and includes a plurality of series connected inductors 28 and parallel connected capacitors 30. Each of these series connected inductors is electrically connected in series with one of the output phase conductors. A wye connected neutral forming transformer 32 is provided to define a neutral conductor N. The output phase conductors of the DC link VSCF power sources are connected through the contacts of a pair of generator control contactors 34 and 36 and the contacts of a pair of load control contactors 38 and 40 to a plurality of loads 42. The contacts 44 of a bus tie breaker serve as means for connecting the outputs of the power sources to a common bus.

Each DC link VSCF power source also includes a point of regulation voltage sensing circuit 46 and a voltage regulator 48 which controls the output voltage of generator 14 by way of generator field current excitation on line 50. The generators include a shaft 52 which is driven at a variable speed by an external prime mover, not shown, such as an aircraft engine. A clock signal, such as a 400 hertz squarewave, is supplied by way of terminal 54. This clock signal controls the output frequency of the power sources. Current transformers 56 and 58 which are inductively coupled to output phases A and B, respectively, and associated real error current synchronous demodulators 60 and 62 serve as means for monitoring the total real error current flowing in the output phases of each of the power sources. Current transformer 56 and reactive error current demodulator 64 serve as means for monitoring the reactive error current flowing in at least one of the output phases from each of the power sources. In operation, the demodulators receive synchronous timing waves, in the form of squarewaves by way of data bus 66 with the reactive and real squarewave control signals being separated by 90 electrical degrees. U.S. Pat. No. 4,510,399, issued Apr. 9, 1985 to Baker discloses a demodulator circuit which is suitable for use as items 60, 62 and 64 in the present invention. The disclosure of that patent is hereby incorporated by reference. Real demodulators 60 and 62 function to produce real error current signals on lines 68 and 70. The 400 hertz clock signal is combined with the real demodulator synchronous timing waves on data bus 66 at summation point 72 to produce a first dc signal on line 74. Summation point 72 is in fact a phase detector wherein the phase error between the two ac inputs produces a proportional, dc signal on its output. Such a phase detector is disclosed in U.S. Pat. No. 4,520,319, issued May 28, 1985, and hereby incorporated by reference. This first dc signal is then combined in summation point 76 with the real error current signals (dc) on lines 68 and 70 to produce a phase angle control signal (dc) on line 78. That phase angle control signal is integrated by integrator 80 and the integrated signal serves to control the frequency of a voltage controlled oscillator 82 to produce an oscillating signal on line 84 which enables the waveform pattern generator 24 to control the relative phase angle of the Thevenin voltage of the associated DC link VSCF source. Similarly, the reactive demodulator 64 produces a reactive error current signal on line 86 which is combined in summation point 88 with a voltage magnitude signal produced by sensing circuit 46. This results in a voltage magnitude control signal on line 90 which enables the voltage regulator 48 to control the magnitude of the Thevenin voltage of the associated DC link VSCF power source.

Figure 2:
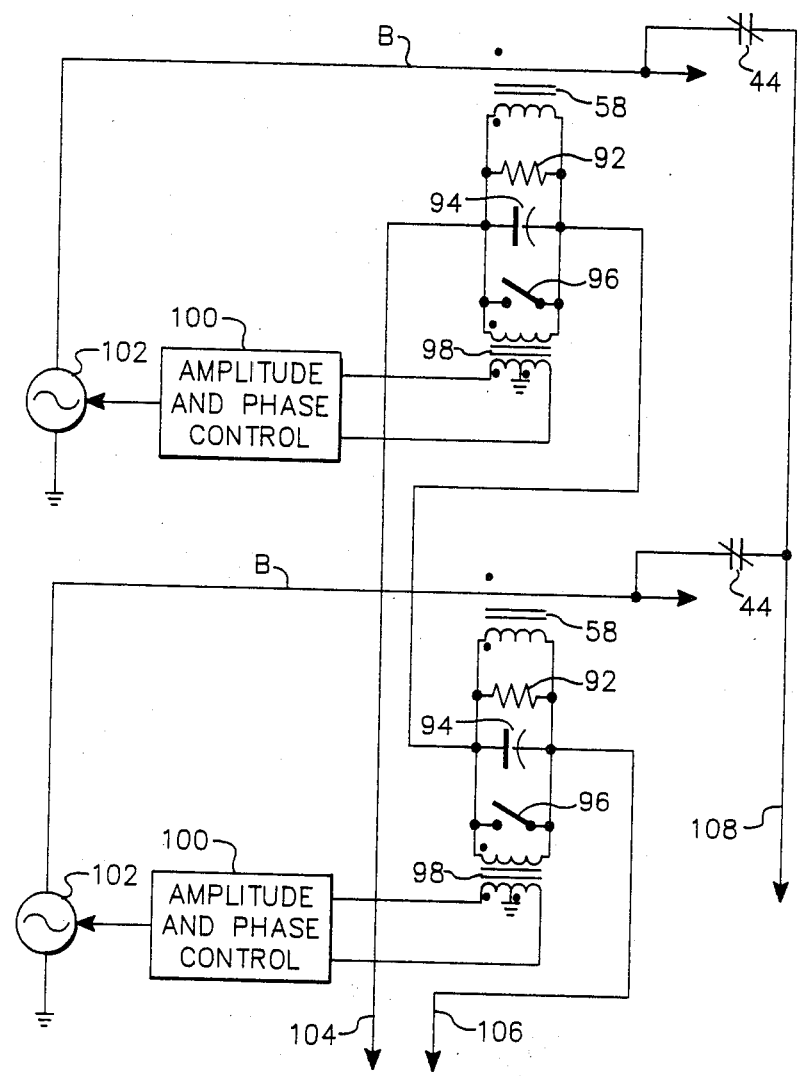
FIG. 2 is a schematic diagram of a portion of the error current sensing circuitry used in the system of FIG. 1.

FIG. 2 is a schematic diagram of a portion of the error current sensing circuitry used in the system of FIG. 1. Current transformers 58 are shown to be connected in series with each other with each current transformer being connected in parallel with a burden resistor 92, a capacitor 94, and a shorting switch 96. Isolation transformers 98 are used to supply the error current signals to the amplitude and phase control circuitry 100 of each DC link VSCF power source 102. Lines 104, 106 and 108 are shown to be connectable to additional power system channels if present. If other channels are not connected, then terminals 104 and 106 are shorted together.

Although the DC link VSCF power sources used in the preferred embodiment of the present invention cannot pass real power from the output phase conductors to the generators, they can accept power into the AC output phases. This power is referred to as negative power and is tolerable up to a point. At exactly zero power, the inverter ideally has no output current and the generator provides a small amount of power to cover the inverter's no load losses. For small negative power levels, the inverter's no load losses will be shared by the generator and the negative power. As the negative power level reaches the inverter's no load losses, the generator will effectively disappear from the system. Any further increase in the negative power will pump up the link voltage, increase the inverter losses, and then stabilize at a link voltage level where the inverter losses and negative power are exactly balanced. The magnitude of the link voltage and the attendant inverter Thevenin voltage are at that point no longer determined by the generator voltage. Instead, they are determined by the magnitude of the real negative power.

This situation is unacceptable since the inflated link voltage on the backfed inverter will cause an unbalance in reactive load current between inverters. Hence, for the special case of no load operation, the reactive current sharing can be greatly affected by errors in the real load loop. Early tests have revealed that, if left unchecked, this situation may result in a 0.5 per unit reactive current unbalance at no load. Even if such a large reactive current was acceptable, the reactive control loop will cause the backfed channel to completely de-excite its generator. This scenario will propagate through all of the parallel connected channels until only one is left and that channel will be in control of the bus voltage. When a load is applied to the parallel bus, the power system will momentarily be capable of providing only single generator performance until the other channels become re-excited. This will cause the system to be soft for typically 20 to 50 milliseconds after load application. To prevent this situation, it is necessary to have the no load, real errors controlled to a value less than the inverter no load losses which are typically 1% of the inverter rating. For this reason, single phase error current sensing, as used in constant speed drive type systems, is insufficient to meet the no load system requirements for a parallel connected DC link VSCF system.

As illustrated in FIG. 1, total real power can be sensed by monitoring N−1 lines of an N line system. For a three-phase system as shown in FIG. 1, either three lines must be sensed after the neutral forming transformer or two lines must be sensed before the neutral forming transformer. The latter approach was taken in order to simplify the current transformer sensing system. Therefore, since one of the current transformers in each channel can be used for both the real and reactive control loop, only two current transformers per channel will be needed for the paralleling controls. Of course, total reactive error current can also be sensed but this is not believed to be necessary since reactive power can flow freely between inverters in the forward or reverse direction with no discontinuity near zero.

Parallel power system constructed in accordance with this invention control real load division by adjusting the relative phase angle of Thevenin voltages of the individual power sources while reactive load division is controlled by the relative magnitude of the Thevenin voltages. During parallel operation, the real load error current results in the displacement of the Thevenin phase angle from the clock signal by an amount determined by the real load division loop gain (real K factor). This is accomplished by injecting a real error current signal into the channel phase locked loop summing junction 76 in FIG. 1. Similarly, the reactive error current results in the displacement of the Thevenin voltage amplitude from the normal or reference amplitude, by an amount determined by the reactive load division loop gain (reactive K factor). This is accomplished by injecting the reactive error current signal into the voltage regulator loop summing junction 88 in FIG. 1. In DC link VSCF parallel systems, steady-state real K factors are much higher than those used on conventional constant speed drive systems. Thus the unbalance errors are much less than conventional systems. However, dynamic K factors are kept nearly the same as in conventional systems, resulting in stability comparable to those systems.

The paralleling error currents are detected in a conventional manner by a difference current transformer arrangement. The current transformers are connected in a loop with a burden resistor across each current transformer and an isolation transformer is used between each burden and the generator control unit circuits. A capacitor is paralleled with each burden resistor. A shorting switch is provided across the current transformer since a non-paralleled channel must have its burdens shorted. If a channel is not part of the parallel system, then its controls are both isolated and disabled.

The systems of the present invention sense total real load error current as opposed to sensing just one phase of the output. This may be accomplished by sensing phase A and B relative to C on the inverter side of the neutral forming transformer. It can be either ahead or after the filter capacitors with no change in system performance. Real and reactive error currents are sensed using the same set of current transformers. The total real error current must be sensed but only one phase is sensed for reactive current control. If necessary, total sensing can be added to the reactive loop by adding an operational amplifier.

It should be noted that the discussion to this point has assumed that the source-to-source impedance in this preferred embodiment is purely inductive. Since no inductor is without resistance and because inverter switching transistors appear resistive, it follows that the sensed error currents will be on a slightly rotated coordinate system. The degree of rotation will be identical to the angle that the difference impedance varies from a purely inductive impedance. For example, if the total difference impedance is +70° (mostly inductive) rather than +90° (purely inductive), then phase angle errors will cause currents along a +20° locus and magnitude errors will cause currents along a −70° locus. Phase angle controls must be derived from a demodulator which has zero output for currents along a −70° axis and maximum output for currents along a +20° axis and vise versa for the magnitude controls. This can be accomplished by either lagging the current transformer burden voltage through the use of a parallel connected capacitor as shown in FIG. 2 or by advancing the synchronous demodulator timing signals (Thevenin angle markers) on line 66 in FIG. 1, by an amount equal to 90° minus the angle of the difference impedance. As a practical matter, it is necessary to have the rotational shift slightly larger in order to take care of the no load condition.

For the special case of no load on the total parallel system, the real current unbalance is limited to the no load losses of the inverter and so provides very little signal to properly command the real load control loop. A consequential effect of unbalanced phase angle between paralleled inverters gives a rise in the DC link voltage on the retarded channel. The rise is large because the relative power generated by a Thevenin angle mismatch is quite large in comparison to the power absorbed by a corresponding mismatch in Thevenin voltage magnitudes. Since under no load conditions, these two power levels must balance, a small real power error (Thevenin angle error) will result in a substantially larger "consequential" reactive power error. This "gain" of consequential reactive power error to real power error will typically approach a factor of ten. This characteristic occurs uniquely at, or very near, the system no load condition.

When the system is loaded at substantially above the inverter loss level, the real power error (angle mismatch) can go to the load rather than inflating the link voltage on the retarded channel.

The circuits of the present invention can easily make use of this special characteristic to let the "consequential" reactive current substantially perform the real load division during the no system load condition. For the purpose of further illustration, consider an example system with a purely inductive difference impedance and a demodulation system with no rotational bias, i.e., no cross sensitivity between the real and reactive loops. Next assume that there is a noise disturbance or error which causes a channel to retard its Thevenin voltage phase angle relative to the other channel(s). The resulting difference current will be almost purely real (power into the retarded channel up to a maximum of inverter losses) which will be sensed by the real loop controls. The signal may be too feeble, because of low inverter losses, to sufficiently restore the system to the desired balanced condition. The consequential reactive current (lagging power factor on the retarded channel) will be much larger but the reactive loop cannot help the problem because it only changes generator excitation level, not phase angle.

Since there is only a feeble real current error signal, it would be desirable to use the larger consequential reactive current error signal to assist the real control loop. This can be done by making the real loop sensitive to reactive currents in the proper direction. We want the phase retarded channel to use its consequential reactive (lagging) difference current to cause the Thevenin angle to advance. It can be shown that the desired effect can be accomplished by adding capacitance to the burden resistor or by advancing the synchronous demodulator timing waves. This is the same remedy as that needed to compensate for difference impedance angle effects already discussed above. Thus we need only to extend the compensation somewhat beyond that which is required to compensate for the difference impedance angle effects. The value of the additional compensation is not critical and it can be shown that five or six degrees is generally suitable, e.g., for a consequential gain of 10 we need a cross sensitivity of 0.1, the cross sensitivity gain is a SIN function of demodulation angle, and the ARCSIN of 0.1 is 5.7 degrees.

With the new arrangement, during no system load operation, the real load division is controlled to accurate levels by a fairly high overall loop gain by taking advantage of the consequential reactive currents via moderate cross sensitivity. This total gain consists of a feeble component of gain from the small real difference current plus a substantial component from the high gain consequential reactive components coupled via a low gain cross sensitivity arrangement. During loaded operation (loads larger than inverter loss levels) the overall real load division is accurate and loop gain is still high but it consists of a now substantial component of gain from the real current difference (not limited by inverter losses) plus the reactive component which has become feeble because the consequential effect has become insignificant.

Although the present invention has been described in terms of what is at present believed to be its preferred embodiment, it will be apparent that various changes may be made without departing from the scope of the invention. It is therefore intended that the appended claims include such changes.

We claim:

1. A parallel power system comprising:
   at least two DC link variable speed, constant frequency power sources each having a Thevenin voltage and a plurality of output phases connected to a multiple phase common bus;
   said power sources having substantially the same output frequency;
   means for monitoring total real error current flowing in said output phases of each of said power sources;
   means for controlling the relative phase angle of the Thevenin voltages of said power sources in response to said total real error current, to reduce the magnitude of said real error current;
   means for monitoring reactive error current flowing in at least one of said output phases of each of said power sources;
   means for controlling the relative magnitude of the Thevenin voltages of said power sources in response to said reactive error current, to reduce the magnitude of said reactive error current.

2. A parallel power system as recited in claim 1, further comprising:
   a plurality of filter inductors, one of said inductors being electrically connected in series with each of said output phases.

3. A parallel power system as recited in claim 1, wherein said means for monitoring error current comprises:
   a plurality of current transformers, each of said transformers being inductively coupled to one of said output phases;
   said transformers which are coupled to connected ones of said output phases, being electrically connected in series with each other; and
   each of said transformers being electrically connected in parallel with a capacitor and a resistor.

4. A parallel power system as recited in claim 1, wherein each of said power sources comprises:
   a variable speed generator;
   a pair of DC link conductors:
   means for rectifying the output of said generator to place a DC voltage on said DC link conductors; and
   means for switching voltage from said DC link conductors to each of said output phases, to produce AC voltages on said output phases.

5. A parallel power system as recited in claim 4, wherein said means for controlling the relative phase angle of the Thevenin voltage comprises:
   a waveform pattern generator for controlling the operation of said switching means and for producing a first signal representative of the phase angle of the Thevenin voltage of one of said power sources; and
   means for combining said first signal with a real error current signal and a clock signal to produce a phase angle control signal;
   said waveform pattern generator being responsive to said phase angle control signal to modify the operation of said switching means.

6. A parallel power system as recited in claim 4, wherein said means for controlling the relative magnitude of the Thevenin voltages comprises:
   means for producing an output voltage magnitude signal, representative of the output voltage of one of said power sources;
   means for combining said output voltage magnitude signal with a reactive error current signal, to produce a generator control signal; and
   means for varying the output of said generator in response to said generator control signal.

7. A parallel power system comprising:
   at least two DC link variable speed, constant frequency power sources each having a Thevenin voltage and N output phases connected to a common bus;

said power sources having substantially the same output frequency;

means for monitoring error current flowing in at least N−1 of said output phases of each of said power sources;

means for demodulating said error current to derive a real error current component and a reactive error current component;

means for controlling the relative phase angle of the Thevenin voltages of said power sources in response to said real error current component, to reduce the magnitude of said real error current component; and means for controlling the relative magnitude of the Thevenin voltages of said power sources in response to said reactive error current component, to reduce the magnitude of said reactive error current component.

8. A parallel power system as recited in claim 7, further comprising:

a plurality of filter inductors, one of said inductors being electrically connected in series with each of said output phases.

9. A parallel power system as recited in claim 7, wherein said means for monitoring error current comprises:

a plurality of current transformers, each of said transformers being inductively coupled to one of said output phases;

said transformers which are coupled to said output phases, being electrically connected in series with each other; and each of said transformers being electrically connected in parallel with a capacitor and a resistor.

10. A parallel power system as recited in claim 7, wherein each of said power sources comprises:

a variable speed generator;

a pair of DC link conductors;

means for rectifying the output of said generator to place a DC voltage on said DC link conductors; and means for switching voltage from said DC link conductors to each of said output phases, to produce AC voltages on said output phases.

11. A parallel power system as recited in claim 10, wherein said means for controlling the relative phase angle of the Thevenin voltages comprises:

a waveform pattern generator for controlling the operation of said switching means and for producing a first signal representative of the phase angle of the Thevenin voltage of one of said power sources; and means for combining said first signal with said real error current component and a clock signal to produce a phase angle control signal;

said waveform pattern generator being responsive to said phase angle control signal to modify the operation of said switching means.

12. A parallel power system as recited in claim 10, wherein said means for controlling the relative magnitude of the Thevenin voltages comprises:

means for producing an output voltage magnitude signal, representative of the output voltage of one of said power sources;

means for combining said output voltage magnitude signal with said reactive error current component, to produce a generator control signal; and means for varying the output of said generator in response to said generator control signal.

13. A method of controlling parallel connected DC link, variable speed, constant frequency multiple phase power sources, said method comprising the steps of:

monitoring total real error current flowing in a plurality of output conductors of at least two, parallel connected constant frequency power sources, each having a Thevenin voltage;

controlling the relative phase angle of the Thevenin voltages of said power sources in response to said total real error current, to reduce the magnitude of said total real error current;

monitoring the reactive error current flowing in at least one of the output conductors of each of said parallel connected constant frequency power sources; and controlling the relative magnitude of the Thevenin voltages of said power sources in response to said reactive error current, to reduce the magnitude of said reactive error current.

14. A method of controlling parallel connected DC link, variable speed, constant frequency N-phase power sources, said method comprising the steps of:

monitoring error current flowing in at least N−1 output conductors of at least two, parallel connected constant frequency power sources, each having a Thevenin voltage;

demodulating said error current to derive a total real error current component and a reactive error current component;

controlling the relative phase angle of the Thevenin voltages of said power sources in response to said total real error current component, to reduce the magnitude of said real error component; and controlling the relative magnitude of the Thevenin voltages of said power sources in response to said reactive error component, to reduce the magnitude of said reactive error component.

15. A parallel power system comprising:

at least two DC link, variable speed, constant frequency power sources each having a Thevenin voltage and a plurality of output phases connected to a common bus;

said power sources having substantially the same output frequency;

means for monitoring total real error current flowing in said output phases of each of said power sources;

means for monitoring reactive error current flowing in at least one of said output phases of each of said power sources;

means for controlling the relative phase angle of the Thevenin voltages of said power sources in response to a combination of said total real error current and said reactive error current; and means for controlling the relative magnitude of the Thevenin voltages of said power sources in response to said reactive error current.

16. A parallel power system as recited in claim 15, further comprising:

a plurality of filter inductors, one of said inductors being electrically connected in series with each of said output phases.

17. A parallel power system as recited in claim 15, wherein said means for monitoring error current comprises:

a plurality of current transformers, each of said transformers being inductively coupled to one of said output phases;

said transformers which are coupled to connected ones of said output phases, being electrically connected in series with each other; and each of said transformers being electrically connected in parallel with a capacitor and a resistor.

18. A parallel power system as recited in claim 15, wherein each of said power sources comprises:
   a variable speed generator;
   a pair of DC link conductors;
   means for rectifying the output of said generator to place a DC voltage on said DC link conductors; and
   means for switching voltage from said DC link conductors to each of said output phases, to produce AC voltages on said output phases.

19. A parallel power system as recited in claim 18, wherein said means for controlling the relative phase angle of the Thevenin voltages comprises:
   a waveform pattern generator for controlling the operation of said switching means and for producing a first signal representative of the phase angle of the Thevenin voltage of one of said power sources;
   means for combining said first signal with a combination error current signal and a clock signal to produce a phase angle control signal, said error current signal being representative of both said real error current signal being representative of both said real error current and said reactive error current; and
   said waveform pattern generator being responsive to said phase angle control signal to modify the operation of said switching means.

20. A parallel power system as recited in claim 18, wherein said means for controlling the relative magnitude of the Thevenin voltages comprises:
   means for producing an output voltage magnitude signal, representative of the output voltage of one of said power sources;
   means for combining said output voltage magnitude signal with a reactive error current signal, to produce a generator control signal; and
   means for varying the output of said generator in response to said generator control signal.

21. A parallel power system comprising;
   at least two DC link variable speed, constant frequency power sources each having a Thevenin voltage and N output phases connected to a common bus;
   said power sources having substantially the same output frequency;
   means for monitoring error current flowing in at least N−1 of said output phases of each of said power sources;
   means for demodulating said error current to derive a real error current component and a reactive error current component;
   means for controlling the relative phase angle of the Thevenin voltages of said power sources in response to a combination of said real error current component and said reactive error current component; and
   means for controlling the relative magnitude of the Thevenin voltages of said power sources in response to said reactive error current component.

22. A parallel power system as recited in claim 21, further comprising:
   a plurality of filter inductors, one of said inductors being electrically connected in series with each of said output phases.

23. A parallel power system as recited in claim 21, wherein said means for monitoring error current comprises:
   a plurality of current transformers, each of said transformers being inductively coupled to one of said output phases;
   said transformers which are coupled to connected ones of said output phases, being electrically connected in series with each other; and
   each of said transformers being electrically connected in parallel with a capacitor and a resistor.

24. A parallel power system as recited in claim 21, wherein each of said power sources comprises:
   a variable speed generator;
   a pair of DC link conductors;
   means for rectifying the output of said generator to place a DC voltage on said DC link conductors; and
   means for switching voltage from said DC link conductors to each of said output phases, to produce AC voltages on said output phases.

25. A parallel power system as recited in claim 24, wherein said means for controlling the relative phase angle of the Thevenin voltages comprises:
   a waveform pattern generator for controlling the operation of said switching means and for producing a first signal representative of the phase angle of the Thevenin voltage of one of the power sources;
   means for combining said first signal with a combination of said real error current component, said reactive error current component and a clock signal to produce a phase angle control signal; and
   said waveform pattern generator being responsive to said phase angle control signal to modify the operation of said switching means.

26. A parallel power system as recited in claim 24, wherein said means for controlling the relative magnitude of the Thevenin voltages comprises;
   means for producing an output voltage magnitude signal, representative of the output voltage of one of said power sources;
   means for combining said output voltage magnitude signal with said reactive error current component, to produce a generator control signal; and
   means for varying the output of said generator in response to said generator control signal.

27. A method of controlling parallel connected DC link, variable speed, constant frequency multiple phase power sources, said method comprising the steps of:
   monitoring total real error current flowing in a plurality of output conductors of at least two, parallel connected constant frequency power sources, each having a Thevenin voltage;
   monitoring the reactive error current flowing in at least one of the output conductors of each of said parallel connected constant frequency power sources;
   controlling the relative phase angle of the Thevenin voltages of said power sources in response to a combination of said total real error current and said reactive error current; and controlling the relative magnitude of the Thevenin voltages of said power sources in response to said reactive error current.

28. A method of controlling parallel connected DC link, variable speed, constant frequency N-phase power sources, said method comprising the steps of;

monitoring error current flowing in at least N−1 output conductors of at least two, parallel connected constant frequency power sources, each having a Thevenin voltage;

demodulating said error current to derive a total real error current component and a reactive error current component;

controlling the relative phase angle of the Thevenin voltages of said power sources in response to a combination of said total real error current component and said reactive error current component; and controlling the relative magnitude of the Thevenin voltages of said power sources in response to said reactive error component, to reduce the magnitude of said reactive error component.

* * * * *